US007634077B2

(12) United States Patent
Owhadi et al.

(10) Patent No.: US 7,634,077 B2
(45) Date of Patent: Dec. 15, 2009

(54) SYSTEM FOR PROVIDING SUPPORT FOR AN ELECTRONIC DEVICE

(75) Inventors: Eric Owhadi, Tomball, TX (US); Christophe Le-Rouzo, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 852 days.

(21) Appl. No.: 10/846,630

(22) Filed: May 17, 2004

(65) Prior Publication Data
US 2005/0027827 A1    Feb. 3, 2005

(30) Foreign Application Priority Data
Jun. 2, 2003    (EP)    .................................. 03291307

(51) Int. Cl.
*H04M 3/00*    (2006.01)
(52) U.S. Cl. .................................... 379/265.02; 714/25
(58) Field of Classification Search ................ 379/265, 379/265.02; 714/46, 25, 26, 27
See application file for complete search history.

(56) References Cited
U.S. PATENT DOCUMENTS

| | | | |
|---|---|---|---|
| 5,678,002 A * | 10/1997 | Fawcett et al. ............... | 715/709 |
| 6,357,017 B1 * | 3/2002 | Bereiter et al. ................ | 714/27 |
| 6,377,944 B1 * | 4/2002 | Busey et al. .................... | 707/3 |
| 6,438,711 B2 * | 8/2002 | Woodruff ...................... | 714/27 |
| 6,594,257 B1 * | 7/2003 | Doshi et al. .................. | 370/352 |
| 7,055,175 B1 * | 5/2006 | Le Pennec et al. ............ | 726/24 |
| 7,275,048 B2 * | 9/2007 | Bigus et al. ................... | 706/46 |
| 2002/0111950 A1 * | 8/2002 | Lee ........................... | 707/100 |
| 2003/0037293 A1 * | 2/2003 | Owhadi ....................... | 714/46 |

\* cited by examiner

*Primary Examiner*—Curtis Kuntz
*Assistant Examiner*—Amal Zenati

(57) ABSTRACT

A support system is provided by which a support agent (10) can assist a user (12) to resolve a problem with a device (14). The support service provides a telephone link (32) between the user (12) and a support agent (10), a call initially being handled by an automated answering service (34) which invites the user (12) to prepare for the call by visiting a support website to run a preparation routine (112) which determines the configuration and state of the client's device (14). Once the data has been harvested, the web application (32) carries out a plurality of sub-routines to determine the operating conditions of the device (14). Where the problem can be corrected automatically, the web application (22) performs this directly. Where this cannot be done, the web application (22) stores the harvested data in memory (25) and provides the user (12) with a location code for that data. The user (12) can then contact the support agent (10) and provide the agent with the location code. Support can thus be provided efficiently without the agent needing to waste time on data harvesting tasks.

13 Claims, 2 Drawing Sheets

SYSTEM FOR PROVIDING SUPPORT FOR AN ELECTRONIC DEVICE

FIELD OF THE INVENTION

The present invention relates to apparatus for and a method of providing support for an electronic device, for example for troubleshooting purposes. The device may be a computer.

BACKGROUND OF THE INVENTION

It is well known to provide support for computers and peripheral devices by remote access, typically by telephone, to a support service. For example, when a user has difficulty with his/her computer, the user can telephone a support service centre and be taken through a diagnostic procedure with a support agent to try to determine the nature of the problem and possible solutions. This often saves having to return the computer to a service centre, at significant cost, by solving the problem remotely. It can also provide additional support for users who may, for example, simply be having difficulties operating the computer rather than there being any technical problem with the computer or other device.

Currently, the methods of providing remote support to a user could be said to fall into two categories. The first category, which is referred to herein as a self-help solution, is aimed at helping the user to fix the problem without needing to contact a support person. This could typically involve the user visiting a website, at which the user is then guided through a diagnostic procedure which is intended to solve the problem with the user's computer. The assignee of the present application provides such a service via its website www.hp.com.

The other category provides for the user to contact a support person by telephone and to be guided by the support person through diagnostic procedures carried out between the support person and the user over the telephone. This solution could also make use of a data harvesting web application, an example of which is disclosed in the assignee's earlier European patent application no. EP-A-1,265,144. The system disclosed in that application provides for a user to be guided by a support agent during a telephone call to open the user's web browser, to connect to a support website and to send a trouble ticket (providing diagnostic results and system configuration) to the website. The connection allows the sharing of data from the user's computer with the support agent's computer so that the support agent can carry out troubleshooting tasks under the supervision of the user.

A disadvantage with the first category of support is that it requires the user to start the support experience with a visit to a self-help website. Although some users may be comfortable with this approach, many are not and would prefer more personal guidance. A drawback of the second category is that much time is wasted by the support person in harvesting data from the user's computer and in solving problems with the user's computer which could be solved automatically. Problems typically include corrupted, defective or out of date software, firmware or system BIOS.

SUMMARY OF THE PRESENT INVENTION

The present invention seeks to provide improved apparatus for and a method of supporting an electronic device.

According to an aspect of the present invention, there is provided a method of supporting remotely a user electronic device including the steps of providing an automated telephonic guidance service for assisting a user in accessing a support web application; running a preparation routine via the web application, which routine harvests data from the user's device; providing for the harvested data to be stored by the web application; providing human support assistance to the user; and providing access by the human support assistance to the harvested data stored by the web application.

The automated service reduces time wastage by the support person in obtaining data from the user's computer.

In the preferred embodiment, the method includes the steps of determining whether automatic repair can be provided for the device via the web application and provides human support assistance to the user only when automatic repair is not available.

The advantage of this method is that the user is guided through a preparation routine carried out via a website which harvests data from the user's device, determines whether the device can be repaired remotely by the web application and, if not, provides access to a human support service once the data has been harvested and stored at the web application. The support person can then provide rapid support to the user.

The data harvested can include one or more of diagnostic data, data identifying the characteristics of the device and device usage data.

The method provides additional assistance with respect to the self-help option described above by providing guidance through the routines performed by the support web application. It is envisaged that the method may provide the option during the automated support call for the user to speak immediately to a support person, even before seeking to access the self-help application. This enables the user to be guided by a person through the data harvesting and collection procedures, which some users with a little experience or confidence could find beneficial.

It is envisaged in some embodiments that the user need make a single telephone call to the support service, whereupon the initial automatic telephone procedure will continue to provide automatic guidance to the user while the user launches the web browser on his/her device, carries out the preparation routine through the web application and eventually is connected through to a support person. This has the advantage of providing the user with the understanding that human support will be immediately available and that the automatic procedure is simply in preparation for that human support. Of course, if the problem can be resolved automatically, the user need not be connected through to a support person.

In another embodiment, the initial call providing the automatic preparation procedure could be terminated while the preparation routine is carried out. The user can then call the support service again, select a separate option within the automatic procedure indicating that this has already been carried out and have access immediately to a support person.

In the preferred embodiment, the user is invited to push the harvested data to the web application, rather than this being done automatically. This can give the user the option to safeguard private data.

It is envisaged that the web application would provide to the user a location code identifying the location where the harvested and stored data is stored via the web application. This location code can then be provided by the user to the support person during the subsequent human-to-human support service. The support person can then access that data through his/her own support computer. In some embodiments, the location code could provide additional information, such as a code indicating the type of problem identified during the automatic procedure. This can enable suitable routing of the user's call to a support person having the right expertise for that problem.

According to another aspect of the present invention, there is provided apparatus for supporting remotely a user electronic device including an automated telephonic guidance service operable to assist a user in accessing a support web application; a preparation routine executable via the web application, which routine harvests data from the user's device; memory for providing for the harvested data to be stored at the web application; a support station providing human support assistance to the user, which support station is operable to provide access by the human support assistance to the harvested data stored by the web application.

DESCRIPTION OF THE DRAWINGS

Embodiments of the present invention are described below, by way of example only, with reference to the accompanying drawings, in which.

DESCRIPTION OF THE PREFERRED EMBODIMENT

Figure 1:
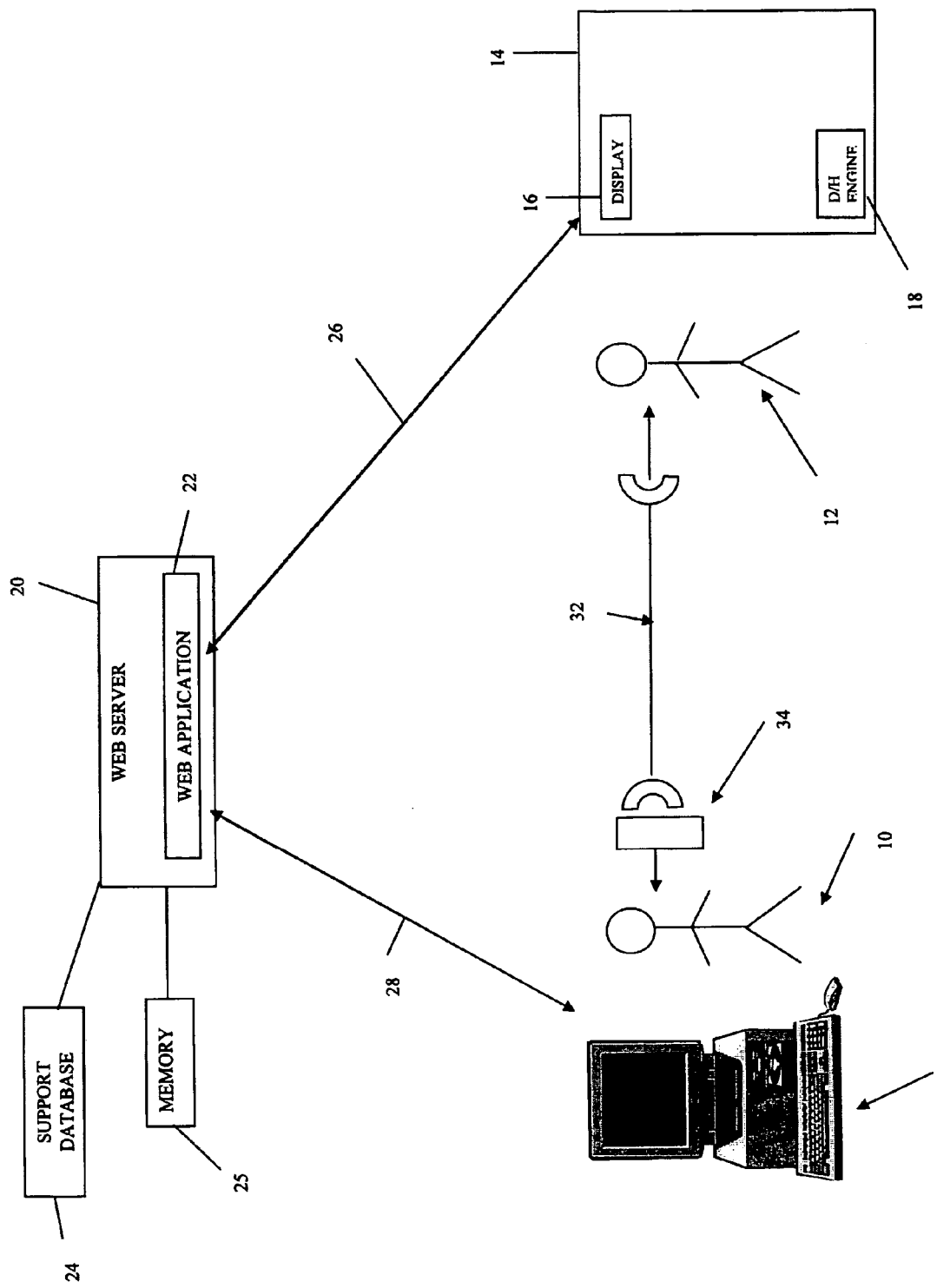
FIG. 1 is a schematic diagram of a preferred embodiment of support system.

FIG. 1 depicts a preferred embodiment of support system by which a support agent 10 can assist a client (user) 12 to resolve a problem with a client electronic device 14. The device 14 is typically a personal computer but could be any device used by the client 12 which is provided with an Internet capability enabling the device 14 to access the World Wide Web. The device could, for example, be a personal digital assistant (PDA) or any other electrical appliance.

The device 14 is provided with a display 16 and a data harvesting diagnostic engine 18. The engine 18 may be permanently incorporated within the device 14 or could be provided to the device 14 when support is required. It could, for example, be stored in a removable storage device such as a CD-ROM or floppy disc or could be obtained from a remote source, such as web application 22 of the support service.

The support service provides a web server 20 accessible via a website and a web application 22 for use in controlling and assisting support to the client 12. One or more support databases 24 provide relevant correction and/or update software, firmware or other data. Two communication links, 26, 28 are provided, one between the web server 20 and client 12 and the other between the web server 20 and the support agent 10. The support agent 10 is also provided with a computer 30 for accessing the web application 22. It will be understood that links 26 and/28 may include suitable firewalls that may be traversed using any suitable firewall crossing techniques, such as http tunnelling.

Communication between the support agent 10 and client 12 is provided by a telephone communications link 32 which, at least initially, is controlled through an automated answering service 34.

Figure 2:
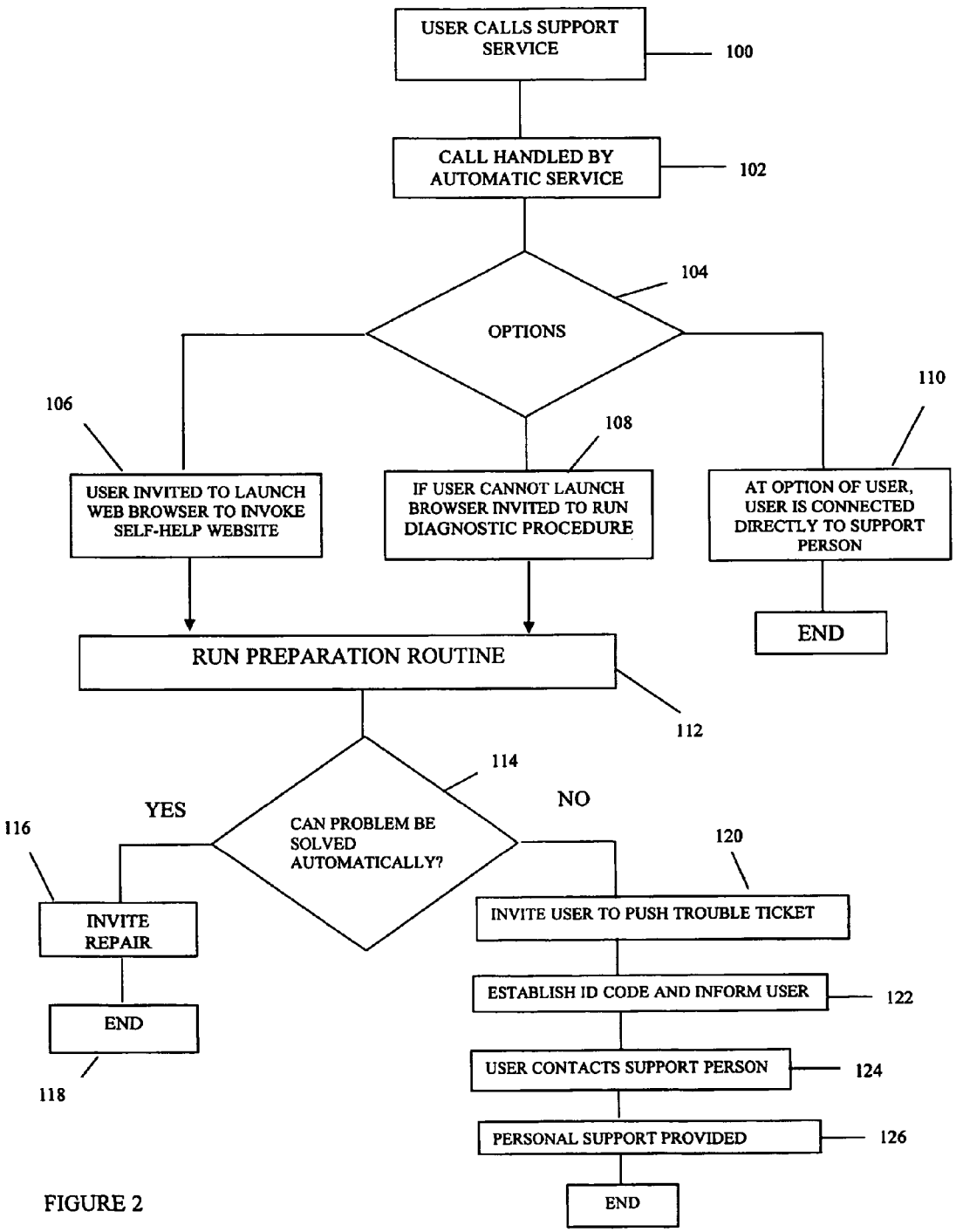
FIG. 2 is a flow chart of a preferred embodiment of support procedure.

Referring now to FIG. 2, there is shown a flow chart of a preferred embodiment of a client support procedure. The procedure starts at step 100, when the user 12 determines that there is a problem with the device 14 which the user cannot solve and thus calls the support service via the telephone line 32.

At step 102 the call is initially handled by the automated answering service 34 which invites the user 12 to prepare for the call by visiting the support website to run a preparation routine. In the preferred embodiment the automated answering service 34 provides the user with three options at step 104. The first option 106 invites the user to launch the web browser of device 14 in order to invoke the self-help procedure provided by web application 22.

If the state of the device 14 is such that the client 12 cannot launch the web browser of the device 14, the automated answering service, in the preferred embodiment, provides the user with the option 108 to run a diagnostic procedure to harvest data from the device 14 and to send that data automatically via the communication line 26 to the web application 22. A suitable system for step 108 is disclosed in the assignee's co-pending European patent application filed under the file reference 200300338 entitled "Method and Apparatus for Providing Support for an Electronic Device". That patent application provides for the basic software and data required to access a web application to be accessible by a data harvesting engine even on failure of the device's operating system. Another suitable system is described in assignee's published European patent application EP1265144.

The preferred embodiment also offers a third option which provides direct connection between the user 12 and the support agent 10, which is useful in cases where the user 12 prefers not to invoke the automatic procedure without human assistance or where the user has already performed this procedure, as explained below. When option 110 is invoked by the user 12, the subsequent support procedure would be handled by the support agent 10, with or without use of the web application 22, as necessary.

Where one of options 106 and 108 is followed, the user 12 establishes communication with the web application 22 through the communication line 26, at which point the web application 22 runs a preparation routine 112 for determining the configuration and state of the client's device 14. The preparation routine 112 harvests, via engine 18, data relating to the client device 14, including details of the hardware components, firmware, software types and versions and, preferably, also the operational history of the device 14 or of relevant components of the device 14. Harvested data could also include data relating to usage of the device 14 by the client 12, for example usage of any particular software application in the case where the device 14 is a computer. For this purpose, the engine 18 could use the Microsoft™ msinfo tool provided for Microsoft Windows-based systems or any other suitable data harvesting tool.

Once the data has been harvested, the web application 32 carries out a series of sub-routines to determine the operating conditions of the device 14. In the preferred embodiment, there is provided an application which carries out software and BIOS update checking, by comparing the harvested data from the device 14 with up-to-date and correct data stored in one or more of the support databases 24. In addition, a sub-routine verifies class issues relating to any epidemic problems such as bugs and problems with components such as hard-disc drives (HDDs), and so on.

Another subroutine provides an on-line diagnostic program to determine whether there are any field replaceable units (such as hard disk drives, memory or other components within the device 14) which would require some form of replacement. This program could be launched on the basis of a specific component of the device 14 highlighted by the user 12 or by the data harvesting/diagnostic engine 18.

Other subroutines check the operational state of components of the device 14, memory space (such as hard disc drive space) and so on.

The skilled person will be aware of what types of subroutines would be appropriate in the preparation routine 112 as these are equivalent to diagnostic routines typically available for such devices.

It is envisaged, of course, that the preparation routine 112 could be in the form of a diagnostic wizard which could be invoked by the user 12 when connecting to the website of the web application 22. In some instances, the wizard would be downloaded into the device 14, in particular in the case where the diagnostic engine 18 is not already stored within the device 14 or accessible by the user 12 and is downloaded with or by the wizard for running the preparation routine 112.

In the preferred embodiment, the preparation routine 112 provides the option 114 of determining whether the problem identified with the client device 14 can be corrected automatically. This could, for example, be as a result of one of the diagnostic tools used in preparation routine 112 identifying a problem with device 14 (typically a component of the device 14) and having access (for example, via the databases 24) to the relevant corrections or updates. Thus, if it is determined at step 114 that the problem can be solved automatically, the routine moves to step 116 where the user is invited to effect the repair. If the repair is successful, the support procedure would end at step 118. Of course, such repair could be carried out within the diagnostic wizard provided by the web application 22.

If at step 114 it is determined that the problem cannot be repaired automatically or that further support should be provided, at step 120 the procedure invites the user 12 to push the harvested data to the web application 22. This is typically provided in the form of a trouble ticket which gives details of the type and configuration of the device 14 and of its components, including hardware components, firmware and software components. It preferably also includes the operational history of the device 14 and of its components.

It is preferred in step 120 that the user is first invited to push the trouble ticket rather than this being done automatically, to give the user 12 ultimate control of his/her data. When the user pushes the trouble ticket to the web application 22, this is stored in memory 25 by the web application 22, either at the web server 20 or at some other memory location.

In reply, at step 122, the procedure provides for establishing an identification code, such as a URL, which identifies at least the memory location at which the trouble ticket is stored and in a preferred embodiment also identifies the device 14. The identification code is then forwarded to the user 12 through the communication line 26.

At step 124 the user 12 contacts the support agent 10 through the telephone line 32. In one embodiment, the initial call made by the user 12 at step 100 is not terminated during steps 102 to 124, in which case the user 12 is preferably kept on a holding routine during the support call until the procedure carries out steps 102 to 124. In another embodiment, the user 12 or automated service 34 could terminate the initial call made at step 100 until the user 12 has been given the identification code at step 122, only then to make a further call to the support service.

At step 126, personal contact is made between the user 12 and the support person 10 so that the support person 10 can guide the user 12 through various repair procedures to repair the device 14. For this purpose, the user 12 will provide the support person 10 with the identification code obtained at step 122 to enable the support person 10, via the support computer 30, to access the trouble ticket via the communications link 28 with the support website. The identification code could be provided to the support agent in any suitable format, such as a number or alpha-numeric code, an electronic sound and so on. In the case of an electronic sound, this could be a coded sound signal which can be supplied to the support agent 10 through the telephone link 22 between the user 12 and the support agent 10 which is then automatically detected by the computer 30 of the support agent 10 as described in EP1265144.

It is preferred that at step 124 the automated answering service 34 will provide the user 12 with an option 110 to indicate that he/she has carried out the preparation procedure with the web application 22 so that the user can be connected directly with a support agent 10. This could, for example, be by a suitable keypad entry made by the user 12 or by the user 12 inputting the identification code via the telephone keypad. In the latter instance, it is envisaged in some embodiments that the identification code provided at step 122 could also give an indication of the fault identified with the device 14. Advantageously, this code could then direct the user's call to a suitable support agent 10 who has the expertise to deal with that particular problem. This would enable efficient handling of queries by suitably skilled support personnel.

The system thus provides for the preparation of the trouble ticket before there is personal contact between the user 12 and support agent 10 while providing effective guidance to the user 12 in carrying out the required data harvesting and also in carrying out preliminary diagnostic and repair procedures, as appropriate. Of course, in the case of where the user 12 would prefer human-to-human contact to guide in the preparation and pushing of the trouble ticket to the web application 22, this could be done via the automated answering service 34 and with a support person of sufficient skill only to assist the user 12 in this part of the procedure, without needing to use a support person 10 of greater expertise. Thus, more expensive, highly skilled support personnel 10 could be spared until the initial procedures have been carried out and all the required information has already been collected and stored by the web application 22.

The system also provides, in a preferred embodiment, for the possibility of automatic correction of some defects by, for example, repair or replacement of software and/or firmware.

It is envisaged that a user 12 could initiate the support procedure by initially accessing the web site, without first contacting the telephonic service. In this case, as appropriate, the system would then invite the user 12 to contact a support agent 10, in other words carrying out steps 112 to 126 of the routine of FIG. 2.

We claim:

1. A method of supporting remotely a user electronic device, comprising:

providing an automated telephonic guidance service for assisting a user in accessing a web application, wherein the automated telephonic guidance service presents the user with a plurality of procedural options to obtain remote support of the user electronic device, wherein the options include at least direct human support assistance, launching a web browser to invoke a self help procedure, and running a diagnostic procedure;

running a preparation routine via the web application, wherein said routine harvests data from the user's device, wherein the data relates to the configuration and state of the user's device;

determining whether automatic repair can be provided for the device via the web application;

if automatic repair can be provided for the device via the web application, providing such automatic repair using a diagnostic wizard provided by the web application;

if automatic repair cannot be provided for the device via the web application, providing for the harvested data to be stored by the web application;
providing human support assistance to the user; and
providing access by the human support assistance to the harvested data stored by the web application.

2. A method according to claim 1, wherein the data harvested includes at least one of: diagnostic data, data identifying the characteristics of the device and device usage data.

3. A method according to claim 1, wherein the preparation routine is carried out during the course of a telephone call by the user to the support service.

4. A method according to claim 1, wherein a telephone call to the automated telephonic guidance service is terminated during the carrying out of the preparation routine.

5. A method according to claim 1, wherein providing for the harvested data to be stored by the web application comprises inviting the user to push the harvested data to the web application.

6. A method according to claim 1, further comprising providing the user a location code identifying the location where the harvested data is stored by the web application.

7. A method according to claim 6, further comprising providing with the location code information relating to the problem identified during the automatic procedure.

8. Apparatus for supporting remotely a user electronic device, comprising:
an automated telephonic guidance service operable to assist a user in accessing a web application, wherein the automated telephonic guidance service presents the user with a plurality of procedural options to obtain remote support of the user electronic device, wherein the options include at least direct human support assistance, launching a web browser to invoke a self help procedure, and running a diagnostic procedure;
a preparation routine executable via the web application, which harvests data from the user's device, wherein the data relates to the configuration and state of the user's device, and wherein the web application is configured to determine whether automatic repair can be provided for the device, and if so, provide such automatic repair using a diagnostic wizard provided by the web application;
memory for providing for the harvested data to be stored by the web application; and
a support station providing human support assistance to the user, wherein said support station is operable to provide access by the human support assistance to the harvested data stored by the web application, wherein the web application is operable to provide human support assistance where it is determined that automatic repair is not available.

9. Apparatus according to claim 8, wherein the data harvested includes at least one of: diagnostic data, data identifying the characteristics of the device and device usage data.

10. Apparatus according to claim 8, wherein the web application is operable to invite the user to push the harvested data to the web application.

11. Apparatus according to claim 8, wherein the web application is operable to provide the user a location code identifying the location where the harvested data is stored by the web application.

12. A method of supporting remotely a user electronic device, comprising:
providing an automated telephonic guidance service for assisting a user in accessing a web application, wherein the automated telephonic guidance service presents the user with a plurality of procedural options to obtain remote support of the user electronic device, wherein the options include at least direct human support assistance, launching a web browser to invoke a self help procedure, and running a diagnostic procedure;
running a preparation routine via the web application, which harvests data from the user's device, wherein the data relates to the configuration and state of the user's device; and
determining whether automatic repair can be provided for the device via the web application and if so providing such automatic repair using a diagnostic wizard provided by the web application;
wherein when automatic repair cannot be carried out, the method comprises:
providing for the harvested data to be stored by the web application and providing the user a location code identifying the location where the harvested data is stored by the web application; and
providing human support assistance to the user and providing access by the human support assistance to the harvested data stored by the web application using the location code.

13. Apparatus for supporting remotely a user electronic device including
an automated telephonic guidance service operable to assist a user in accessing a web application;
a preparation routine executable via the web application, which harvests data from the user's device, wherein the data relates to the configuration and state of the user's device;
memory for providing for the harvested data to be stored by the web application;
a support station providing human support assistance to the user; wherein the web application is operable to determine whether automatic repair can be provided for the device and if so provides such automatic repair,
wherein when automatic repair is not available,
the web application is operable to store the harvested data in the memory and to provide the user a location code identifying the location where the harvested data is stored, and
the support station is operable to provide access by the human support assistance to the harvested data stored by the web application using the location code,
wherein the automated telephonic guidance service presents the user with a plurality of procedural options to obtain remote support of the user electronic device, wherein the options include at least direct human support assistance, invoking the web application, and running the preparation routine.

* * * * *